US012641683B2

(12) United States Patent
Hamana et al.

(10) Patent No.: US 12,641,683 B2
(45) Date of Patent: May 26, 2026

(54) HEATER

(71) Applicant: KYOCERA Corporation, Kyoto (JP)

(72) Inventors: Yoshiki Hamana, Kirishima (JP); Masashi Sakiyama, Anjo (JP)

(73) Assignee: KYOCERA CORPORATION, Kyoto (JP)

(*) Notice: Subject to any disclaimer, the term of this patent is extended or adjusted under 35 U.S.C. 154(b) by 815 days.

(21) Appl. No.: 17/925,708

(22) PCT Filed: May 14, 2021

(86) PCT No.: PCT/JP2021/018402
§ 371 (c)(1),
(2) Date: Nov. 16, 2022

(87) PCT Pub. No.: WO2021/241276
PCT Pub. Date: Dec. 2, 2021

(65) Prior Publication Data

US 2023/0199915 A1 Jun. 22, 2023

(30) Foreign Application Priority Data

May 25, 2020 (JP) ................................ 2020-090738

(51) Int. Cl.
*H05B 3/06* (2006.01)
*A24F 40/46* (2020.01)
*H05B 3/46* (2006.01)

(52) U.S. Cl.
CPC ............... *H05B 3/06* (2013.01); *A24F 40/46* (2020.01); *H05B 3/46* (2013.01)

(58) Field of Classification Search
None
See application file for complete search history.

(56) References Cited

U.S. PATENT DOCUMENTS 4,808,490 A * 2/1989 Tsukuda .................. H05B 3/12 338/308
5,269,327 A * 12/1993 Counts .................. A24F 40/30 131/194
5,505,214 A * 4/1996 Collins .................. H05B 3/24 131/194
5,666,978 A * 9/1997 Counts .................. A24D 1/20 131/194
5,692,525 A * 12/1997 Counts .................. A24D 3/17 131/194
5,692,526 A * 12/1997 Adams .................. A24C 5/01 131/365
5,820,900 A * 10/1998 McGrevy ............ B29C 45/2737 425/549

(Continued)

FOREIGN PATENT DOCUMENTS

JP 2019-521656 A 8/2019

*Primary Examiner* — Thor S Campbell
(74) *Attorney, Agent, or Firm* — Volpe Koenig

(57) ABSTRACT

A heater includes a heater member and a peripheral wall. The heater member includes a cylindrical ceramic body, a heat element in the ceramic body, and multiple flanges fixed on an outer circumferential surface of the ceramic body and extending away from the outer circumferential surface. The peripheral wall surrounds the heater member in an axial direction and a circumferential direction. A first flange is located in one direction from a middle of the ceramic body in the axial direction, and a second flange is located in another direction from the middle of the ceramic body in the axial direction.

4 Claims, 9 Drawing Sheets

(56) References Cited

U.S. PATENT DOCUMENTS

| | | | | | |
|---|---|---|---|---|---|
| 5,954,979 | A * | 9/1999 | Counts | A24F 40/485<br>131/194 |
| 6,043,466 | A * | 3/2000 | Jenko | B29C 45/1782<br>219/535 |
| 6,116,247 | A * | 9/2000 | Banyasz | A24F 40/85<br>131/243 |
| 6,163,016 | A * | 12/2000 | Johnson | B29C 45/1782<br>219/535 |
| 6,410,894 | B1 * | 6/2002 | Hoffmann | H05B 3/42<br>425/549 |
| 7,034,258 | B2 * | 4/2006 | Sutorius | B29C 45/2737<br>219/535 |
| 7,241,131 | B1 * | 7/2007 | Booth | B29C 45/74<br>425/549 |
| 10,863,766 | B2 * | 12/2020 | Sutton | A24D 1/20 |
| 10,881,138 | B2 * | 1/2021 | Saleem | H05B 3/146 |
| 11,337,459 | B2 * | 5/2022 | Reevell | A24F 40/50 |
| 11,344,067 | B2 * | 5/2022 | Lee | F21V 3/00 |
| 11,700,884 | B2 * | 7/2023 | An | H05B 1/0227<br>131/329 |
| 11,700,886 | B2 * | 7/2023 | Kim | H05B 3/20<br>131/329 |
| 11,957,177 | B2 * | 4/2024 | Yamada | A24F 40/46 |
| 12,239,158 | B2 * | 3/2025 | Lavanchy | B32B 15/20 |
| 12,245,337 | B2 * | 3/2025 | Krietzman | A24B 15/16 |
| 12,262,748 | B2 * | 4/2025 | Chen | H05B 3/46 |
| 2002/0005207 | A1 * | 1/2002 | Wrenn | A24D 1/20<br>131/194 |
| 2007/0086759 | A1 * | 4/2007 | Russegger | B29C 45/2737<br>392/473 |
| 2019/0208816 | A1 * | 7/2019 | Thorsen | A24F 40/485 |

* cited by examiner

HEATER

TECHNICAL FIELD

The present disclosure relates to a heater.

BACKGROUND OF INVENTION

A known technique is described in, for example, Patent Literature 1.

CITATION LIST

Patent Literature

Patent Literature 1: Japanese Unexamined Patent Application Publication (Translation of PCT Application) No. 2019-521656

SUMMARY

In one aspect of the present disclosure, a heater includes a heater member including a ceramic body being cylindrical, a heat element in the ceramic body, and a plurality of flanges fixed on an outer circumferential surface of the ceramic body and extending away from the outer circumferential surface, and a peripheral wall surrounding the heater member in an axial direction and a circumferential direction. One flange of the plurality of flanges is located in one direction from a middle of the ceramic body in the axial direction, and another flange of the plurality of flanges is located in another direction from the middle of the ceramic body in the axial direction.

BRIEF DESCRIPTION OF THE DRAWINGS

The objects, features, and advantages of the present disclosure will become more apparent from the following detailed description and the drawings.

DESCRIPTION OF EMBODIMENTS

A known heater with the structure that forms the basis of a heater according to one or more embodiments of the present disclosure is a cylindrical heater included in a heating device for heating a heating target, such as a cigarette, a food, or a pharmaceutical agent. Such a heating device includes multiple flanges fixing an outer circumferential surface of the heater and an inner circumferential surface of a housing (refer to, for example, Patent Literature 1).

The heater according to one or more embodiments of the present disclosure will now be described with reference to the drawings.

Figure 1:
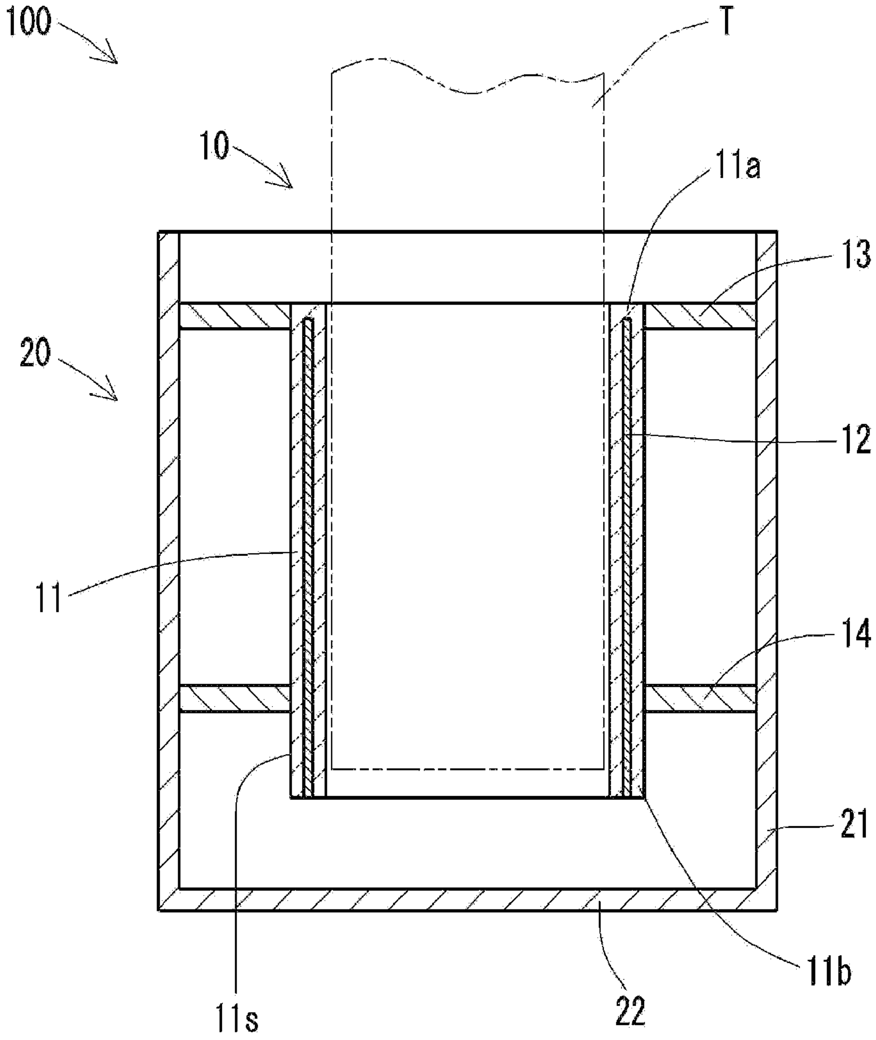
FIG. 1 is a longitudinal sectional view of a heater according to a first embodiment.
Figure 2:
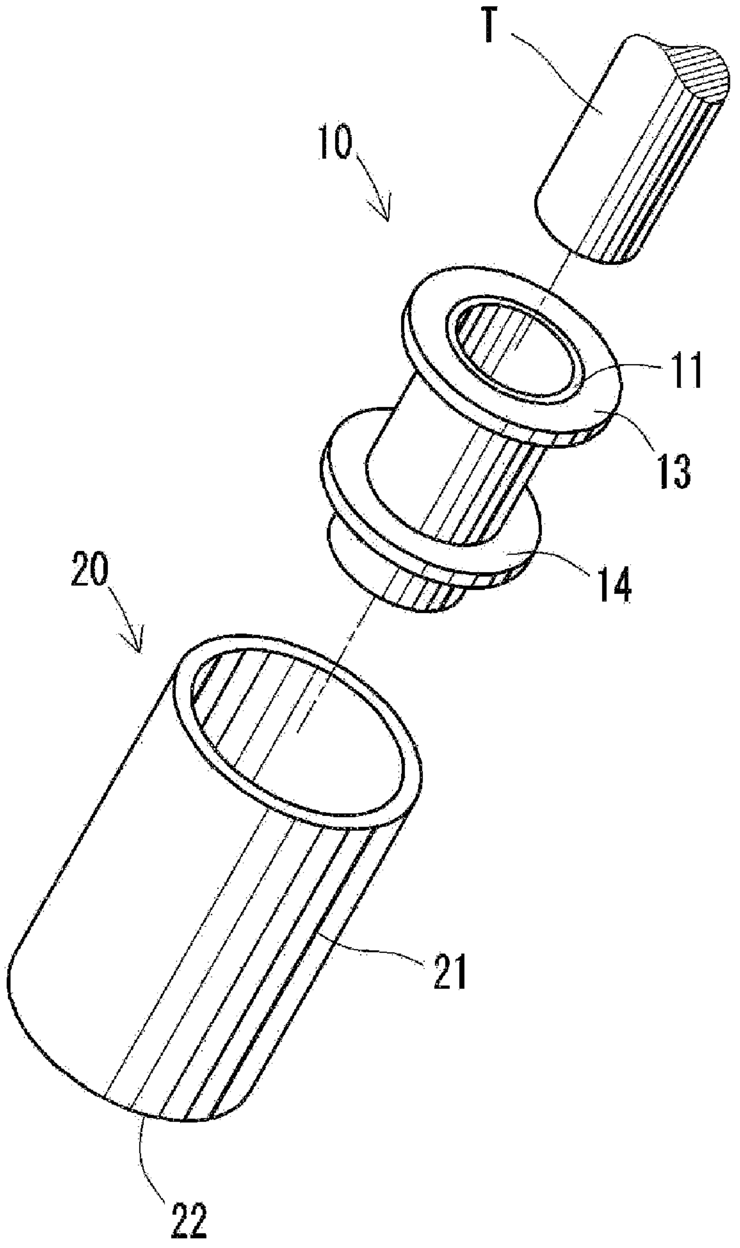
FIG. 2 is an exploded perspective view of the heater.

FIG. 1 is a longitudinal sectional view of a heater according to a first embodiment. FIG. 2 is an exploded perspective view of the heater. In the present embodiment, a heater 100 includes a heater member 10 and a peripheral wall 20. The heater member 10 includes a cylindrical ceramic body 11, a heat element 12 located on the ceramic body 11, and multiple flanges 13 and 14 that are fixed on an outer circumferential surface 11*s* of the ceramic body 11 and extend away from the outer circumferential surface 11*s*. The peripheral wall 20 surrounds the heater member 10 in the axial direction and the circumferential direction. A heating target T indicated by an imaginary line in FIG. 1 is, for example, a columnar cigarette. The heater 100 can heat the heating target T that is inserted inside the cylindrical ceramic body 11 with heat generated by the heat element 12.

The ceramic body 11 is a cylindrical member and includes one end (also referred to as a first end) 11*a* and the other end (hereafter also referred to as a second end) 11*b* in a longitudinal direction (in the vertical direction on the page of FIG. 1). The ceramic body 11 may be, for example, a cylinder, a polygonal prism, or in another shape. In the present embodiment, the ceramic body 11 is a cylinder.

The ceramic body 11 is made of an electrically insulating ceramic material. The ceramic material may be, for example, oxide ceramic such as alumina or zirconia, nitride ceramic such as aluminum nitride, carbide ceramic such as silicon carbide, or silicon nitride ceramic.

The heat element 12 generates heat when energized and is located inside or on the surface (inner circumferential surface or outer circumferential surface) of the ceramic body 11. The heat element 12 may include a connecting portion at the end of the heat element 12 for connection to an external wire and may be energized through the connecting portion. The heat element 12 is made of, for example, tungsten, molybdenum, chromium, their carbide, or a metal such as gold, silver, or palladium. The heat element 12 may contain, for example, alumina or silicon nitride as a component other than the metal. The heat element 12 may have any shape that extends across the ceramic body 11 to generate heat. The heat element 12 may have, for example, a spiral shape having the same axis as the axis of the ceramic body 11, or a meandering shape including multiple straight lines parallel to the axis of the ceramic body 11 and multiple connections connecting ends of the straight lines to each other.

The ceramic body 11 is fixed on the peripheral wall 20 with the multiple flanges 13 and 14. In the present embodiment, the heater member 10 includes two flanges 13 and 14. Of the two flanges 13 and 14, the flange 13 (first flange) is located in one direction from the middle of the ceramic body 11 in the axial direction, and the flange 14 (second flange) is located in the other direction from the middle of the ceramic body 11 in the axial direction.

The flanges 13 and 14 are made of, for example, a ceramic material, a metal material, or a resin material. The ceramic material may be, for example, oxide ceramic such as alumina or zirconia, nitride ceramic such as aluminum nitride, carbide ceramic such as silicon carbide, or silicon nitride ceramic. The resin material may be, for example, polyetherether ketone (PEEK), polyamideimide (PAI), or polytetrafluoroethylene (PTFE). The metal material may be, for example, stainless steel, an aluminum alloy, a titanium alloy, a nickel alloy, or a magnesium alloy. The first flange 13 may be made of the ceramic material, the metal material, or the resin material. The second flange 14 may be made of the ceramic material, the metal material, or the resin material. The first flange 13 and the second flange 14 may be made of the same material or different materials.

The peripheral wall 20 is a cylindrical member surrounding the heater member 10 in the axial direction and the circumferential direction. The peripheral wall 20 may be, for example, a cylinder, a polygonal prism, or in another shape. In the present embodiment, the peripheral wall 20 is a cylinder including one end in the axial direction being open and the other end in the axial direction being closed with a bottom. The peripheral wall 20 includes a cylinder 21 and a bottom 22.

In the present embodiment, the ceramic body 11 in the heater member 10 includes the first end 11*a* located adjacent to the open end of the peripheral wall 20, and the second end 11*b* facing the bottom 22 of the peripheral wall 20. For example, a space is left between the second end 11*b* of the ceramic body 11 and the bottom 22 of the peripheral wall 20, and a power supply such as a battery and a power supply control circuit can be located in this space. A connection terminal may be located at an end of the heat element 12 that is exposed to the second end 11*b* of the ceramic body 11 and may be connected to the power supply control circuit with a wire. The peripheral wall 20 may include the cylinder 21 alone, with the other end in the axial direction also being open. In this case, for example, the power supply and the power supply control circuit may be located outside the peripheral wall 20 and may be connected to the end of the heat element 12 that is exposed to the second end 11*b* of the ceramic body 11 with a wire.

The material for the peripheral wall 20 may be any material that can support the heater member 10. Examples of the material include a metal material and a resin material. The metal material may be, for example, stainless steel, an aluminum alloy, a titanium alloy, a nickel alloy, or a magnesium alloy. The resin material may be, for example, a silicone resin or a polyimide resin. The metal material and the resin material may be combined.

The temperature distribution of the ceramic body 11 based on heat generated by the heat element 12 shows a higher temperature at the middle in the axial direction and a low temperature that gradually decreases from the middle in the axial direction toward both ends in the axial direction. The first flange 13 and the second flange 14 are located nearer the ends of the ceramic body 11 in the axial direction than the middle of the ceramic body 11 in the axial direction. The middle in the axial direction is herein, for example, a portion located at a middle when the length in the axial direction of the ceramic body 11 is equally divided into three. In this case, a heat transfer path from the ceramic body 11 to the peripheral wall 20 through the flanges 13 and 14 is a path on which heat avoids the middle in the axial direction and passes through lower-temperature portions nearer the ends in the axial direction. This reduces heat loss and improves the heating performance of the heater 100.

In the present embodiment, the first flange 13 is located at the first end 11*a* of the ceramic body 11. The second flange 14 is located between the second end 11*b* and the middle of the ceramic body 11. The first end 11*a* of the ceramic body 11 is a portion with the lowest temperature between the middle and the first end 11*a* in the temperature distribution of the ceramic body 11. The first flange 13 is located in the lower-temperature portion of the ceramic body 11 to further reduce heat loss.

To heat the heating target T, the ceramic body 11 has the inner diameter that is the same as or slightly smaller than the outer diameter of the heating target T to allow the heating target T to come in close contact with the inner circumferential surface of the ceramic body 11. When a user inserts the heating target T into the ceramic body 11 in using the heater 100, an external force is likely to be applied to the ceramic body 11 in a direction deviating from the axial direction. In particular, the first end 11*a* of the ceramic body 11 through which the heating target T is inserted receives a larger external force, and thus is supported with the first flange 13 to reduce, for example, the positional deviation of the heater member 10 under the external force and detachment of the heater member 10 from the peripheral wall 20.

The first flange 13 is located at the first end 11*a* of the ceramic body 11 and thus is distant from the middle of the ceramic body 11 with a higher temperature. In this case, the heat transfer path from the ceramic body 11 to the peripheral wall 20 can be longer than when the first flange 13 is not located at the first end 11*a*. This can reduce heat loss and increase the temperature increasing rate.

The inner diameter of the ceramic body 11 may be adjusted as appropriate for the use of the heater 100. For the heater 100 as a portable heater for foods in outdoor activities such as a camping activity, the inner diameter of the ceramic body 11 may be, for example, about 5 cm to correspond to the average size of foods (e.g., skewered grilled chicken, skewered food, or sausage) as the heating target. For the heater 100 as a heating device for a cigarette, the inner diameter of the ceramic body 11 may be, for example, about 1 cm to correspond to the size of the cigarette that is the heating target. For the heater 100 as a heating device for, for example, a medical needle for acupuncture therapy (acupuncture), the inner diameter of the ceramic body 11 may be, for example, about 2 cm.

Figure 3:
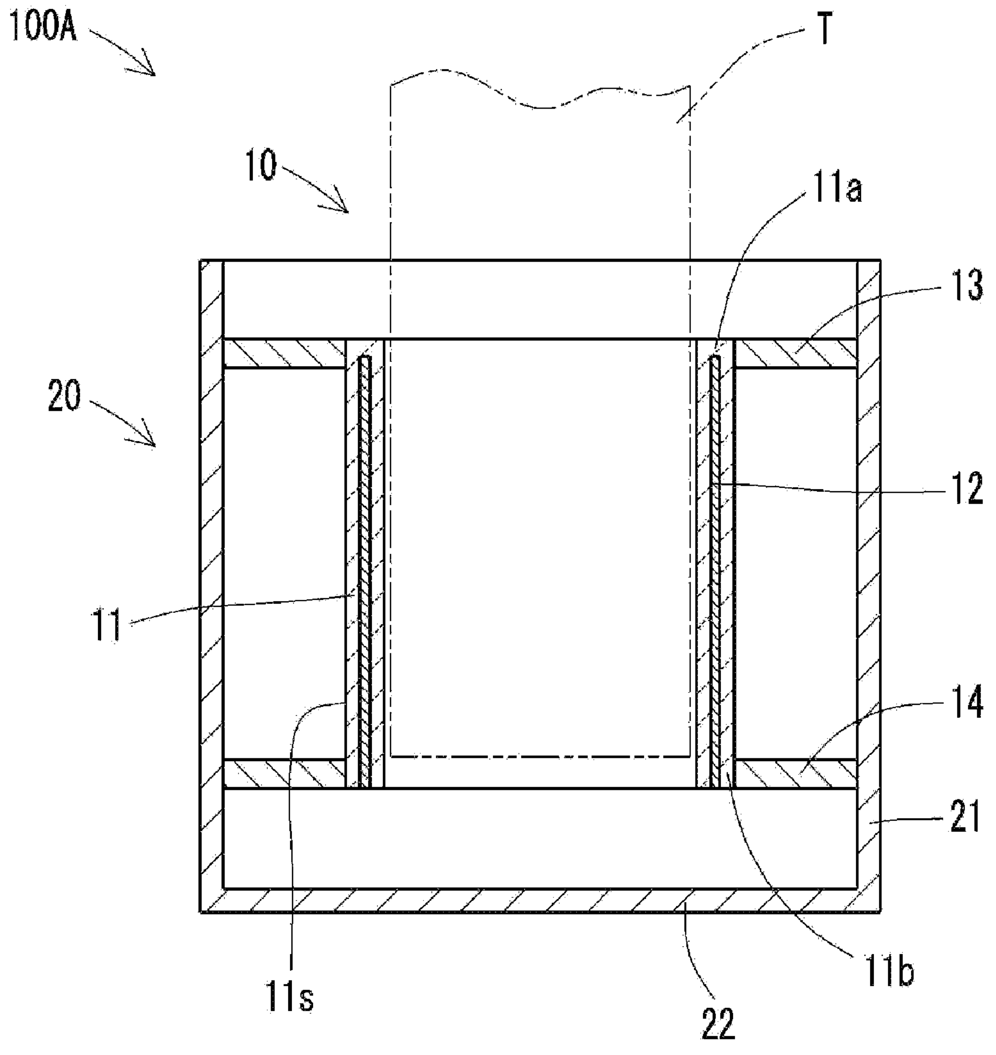
FIG. 3 is a longitudinal sectional view of a heater according to a second embodiment.

FIG. 3 is a longitudinal sectional view of a heater according to a second embodiment. In the second embodiment, a heater 100A is the same as the heater 100 according to the first embodiment except that the second flange 14 is located at the second end 11*b* of the ceramic body 11. The components other than the second flange 14 will not be described. The second end 11*b* of the ceramic body 11 is a portion with the lowest temperature between the middle and the second end 11*b* in the temperature distribution of the ceramic body 11. The second flange 14 is located in a portion of the ceramic body 11 with a lower temperature to further reduce heat loss.

For example, the heat element 12 is exposed at the second end 11*b* of the ceramic body 11 and is connected to a power supply control circuit with a wire. When a user inserts the heating target T into the ceramic body 11, an external force is applied to the ceramic body 11 in a direction deviating from the axial direction, causing the second end 11*b* of the ceramic body 11 to be displaced more largely than the first end 11*a*. When the second end 11*b* is repeatedly displaced by insertion and removal of the heating target T, for example, the wire is broken or disconnected, causing connection failure between the power supply circuit and the heat element 12. As in the present embodiment, the second flange 14 is located at the second end 11*b* of the ceramic body 11, thus reducing the displacement of the second end 11*b* and connection failure between the heat element 12 and the power supply circuit.

Figure 4:
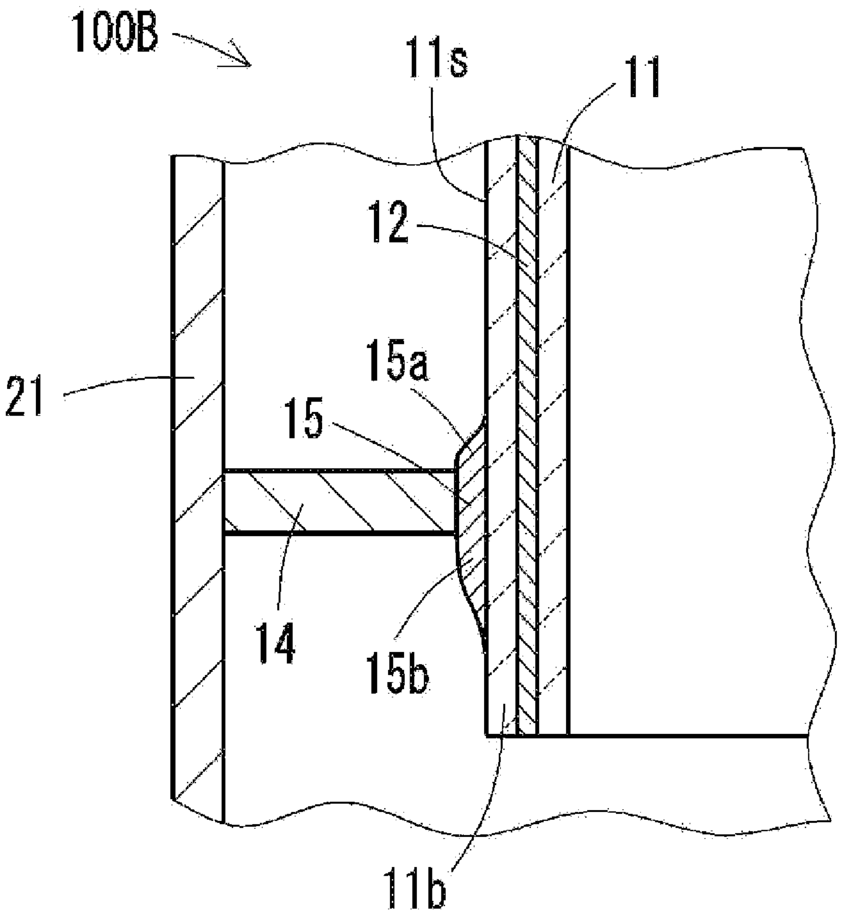
FIG. 4 is a longitudinal sectional view of a heater according to a third embodiment.

FIG. 4 is an enlarged cross-sectional view of a heater according to a third embodiment. In the third embodiment, a heater 100B is the same as the heater 100 according to the first embodiment except that the second flange 14 is fixed on the outer circumferential surface 11*s* of the ceramic body 11 with a glass material 15. The components other than the glass material 15 will not be described. The glass material 15 may be, for example, borosilicate glass or quartz glass.

The glass material 15 is located between the second flange 14 and the ceramic body 11. The glass material 15 includes a portion located from the second flange 14 toward the middle of the ceramic body 11 in the axial direction, and another portion located from the second flange 14 toward the other end (toward the second end 11*b*) of the ceramic body 11 in the axial direction. In the present embodiment, of the glass material 15, the amount of a portion 15*a* located toward the middle is smaller than the amount of a portion 15*b* located toward the second end 11*b*. The glass material 15 may also be included in the heat transfer path. A smaller amount of the portion 15*a* located toward the middle can thus reduce heat less. A larger amount of the portion 15*b* located toward the second end 11*b* can increase the strength of bonding between the second flange 14 and the ceramic body 11.

In the first to third embodiments, for example, the first flange 13 may be made of a resin material, and the second flange 14 may be made of a ceramic material. As described above, a larger external force tends to be applied to the first end 11*a* of the ceramic body 11 through which the heating target T is inserted. With the first flange 13 made of a resin material located at the first end 11*a*, the elastic resin material can disperse the external force to allow a slight displacement of the first end 11*a*. As described above, the second end 11*b* of the ceramic body 11 tends to be displaced more largely than the first end 11*a* during insertion and removal of the heating target T. The second flange 14 made of a ceramic material can reduce the displacement of the second end 11*b*. The slight displacement of the first end 11*a* is allowed to further reduce the displacement of the second end 11*b*. This reduces connection failure between the heat element 12 and the power supply circuit.

Figure 5:
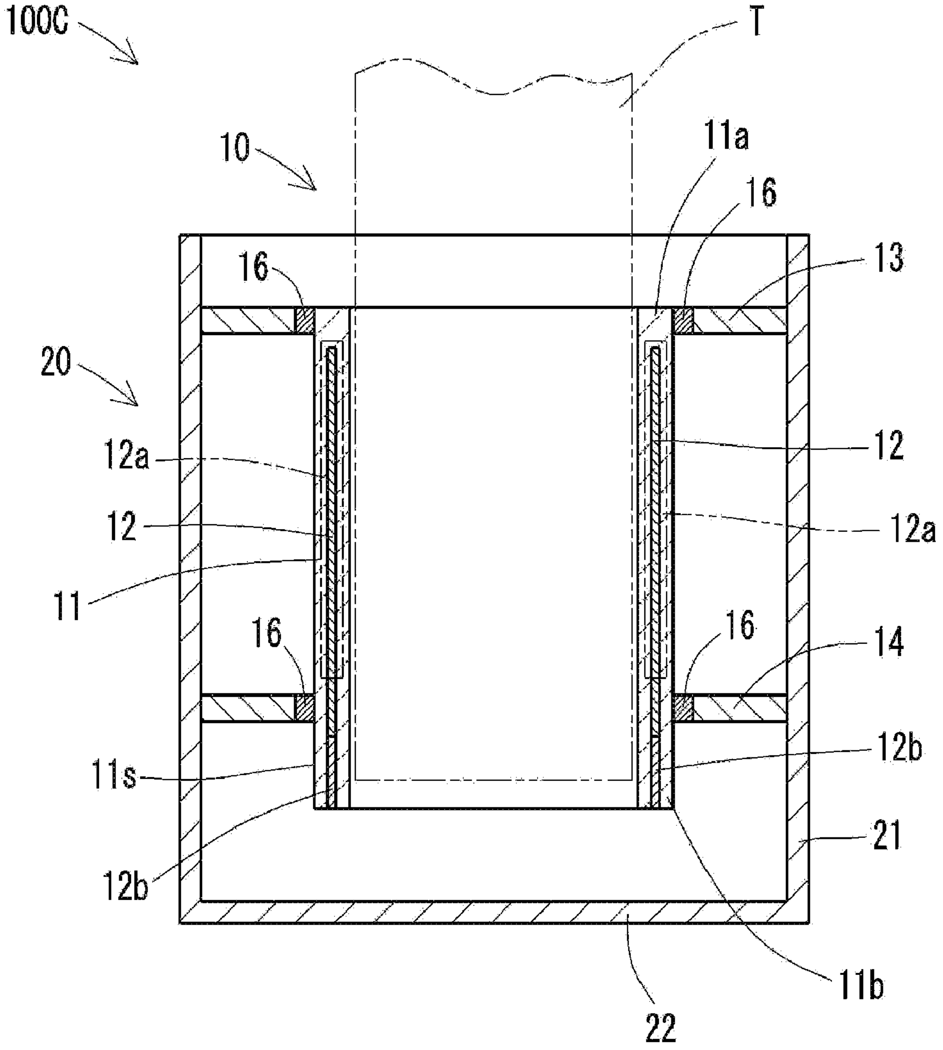
FIG. 5 is a longitudinal sectional view of a heater according to a fourth embodiment.
Figure 6:
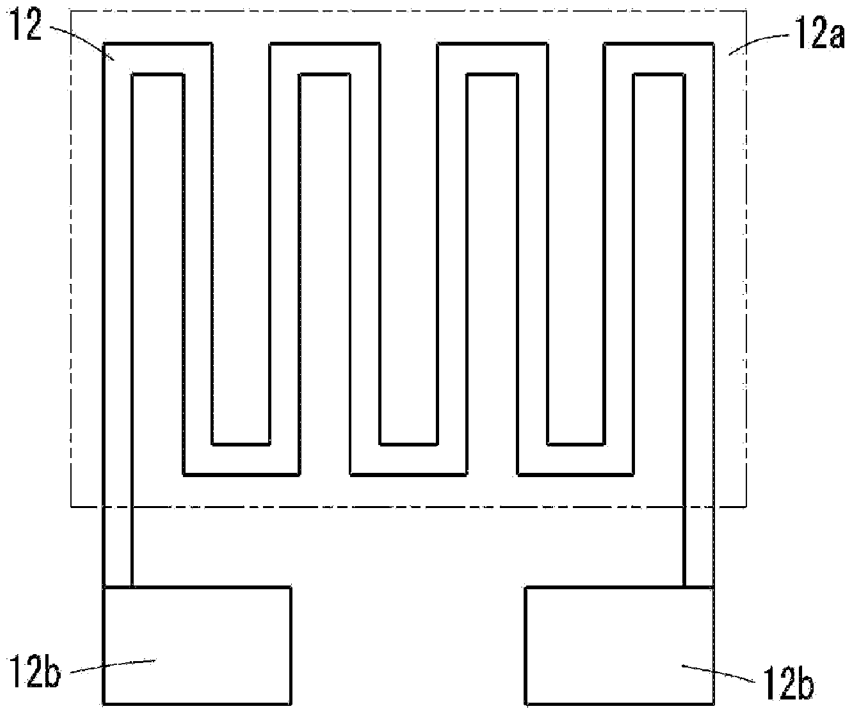
FIG. 6 is a development view of a heat element.

FIG. 5 is a longitudinal sectional view of a heater according to a fourth embodiment. FIG. 6 is a development view illustrating the shape of the heat element. The heat element 12 has a cylindrical shape along the ceramic body 11, which is easily understood from the development view of FIG. 6. The vertical direction of the page is the axial direction of the ceramic body 11. In the present embodiment, the heat element 12 has a meandering shape including multiple straight lines parallel to the axis of the ceramic body 11 and multiple connections connecting ends of the straight lines to each other as illustrated in FIG. 6. The meandering shape includes the straight lines adjacent to each other and bent portions between the straight lines and the connections, and thus includes a higher-temperature region 12*a* that generates a large amount of heat. The heat element 12 includes a connecting portion 12*b* for external electrical connection. The connecting portion 12*b* has a greater width and a lower resistance than a wire in the higher-temperature region 12*a* to reduce heat generation.

In the present embodiment, a heater 100C includes the first flange 13 and the second flange 14 that do not overlap with the higher-temperature region 12*a* in the heat element 12 as viewed in a direction orthogonal to the axis of the ceramic body 11. In this case, the heat transfer path from the ceramic body 11 to the peripheral wall 20 through the flanges 13 and 14 is a path that avoids a higher-temperature portion. This reduces heat loss and improves the heating performance of the heater 100C.

In the present embodiment, the first flange 13 and the second flange 14 are made of a metal material, and the peripheral wall 20 may also be made of a metal material. In the present embodiment, the heater 100C includes the first flange 13 and the second flange 14 that are made of a metal and are fixed on the outer circumferential surface 11*s* of the ceramic body 11 with a brazing material. To increase the bonding strength with the brazing material, a bonding layer 16 may be located on the outer circumferential surface 11*s* of the ceramic body 11. The bonding layer 16 may be made of one type or two or more types of metal materials selected from, for example, Mo, W, Mn, Ag, Cu, and Ti. The bonding layer 16 may be formed as a metallized layer. For example, the bonding layer 16 may be formed by high-melting point metallization such as Mo—Mn metallization or W metallization or active metallization such as Ag—Cu—Ti metallization. To improve, for example, wetting with the brazing material, a metal plating layer made of, for example, gold or nickel may be further formed on the bonding layer 16. Brazing through the bonding layer 16 can increase the bonding between the first flange 13 and the ceramic body 11, and between the second flange 14 and the ceramic body 11. The bonding layer 16 may continuously extend in the circumferential direction as a strip on the outer circumferential surface 11*s* of the ceramic body 11, or may intermittently and partially extend in the circumferential direction at equal intervals on the outer circumferential surface 11*s* of the ceramic body 11.

When the bonding layer 16 extends continuously in the circumferential direction as a strip on the outer circumferential surface 11*s* of the ceramic body 11, and the first flange 13 and the second flange 14 are bonded to the peripheral wall 20, for example, with a brazing material, a space surrounded by the first flange 13, the second flange 14, the ceramic body 11, and the peripheral wall 20 can be a closed space. This closed space is to be a vacuum for thermal insulation. This reduces heat dissipation from the middle of the ceramic body 11 in the axial direction with a relatively higher temperature to improve the heating performance of the heater 100C.

To electrically connect the connecting portion 12*b* in the heat element 12 to the external wire, the connecting portion 12*b* may be exposed from the ceramic body 11. In this case, the ceramic body 11 includes an inner portion 110 and an outer portion 111. The inner portion 110 and the outer portion 111 are cylindrical. The heat element 12 is located between the inner portion 110 and the outer portion 111.

Figure 7:
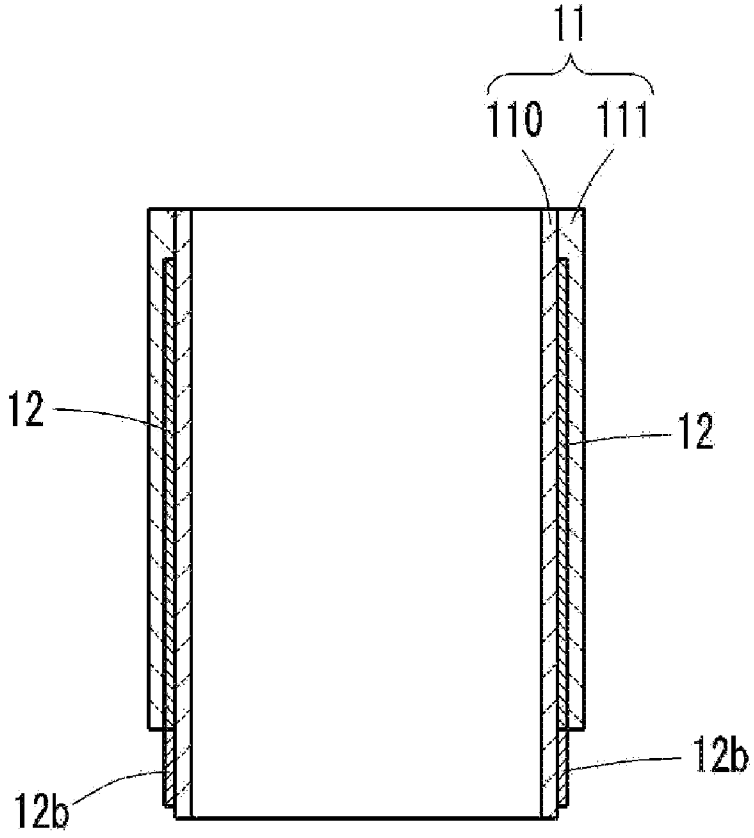
FIG. 7 is a longitudinal sectional view of a ceramic body.

FIG. 7 is a longitudinal sectional view of the ceramic body. For the ceramic body 11 illustrated in FIG. 7, for example, the inner portion 110 is longer than the outer portion 111 and protrudes at the second end 11*b* of the ceramic body 11. The protruding inner portion 110 causes the outer circumferential surface of the inner portion 110 to be exposed, and at least a portion of the connecting portion 12*b* in the heat element 12 to be on this outer circumferential surface. The connecting portion 12*b* includes a portion uncovered with the outer portion 111. The connecting portion 12*b* can thus be electrically connected to the external wire. A metal plating layer made of, for example, gold or nickel may be formed in the exposed area of the connecting portion 12*b*.

Figure 8:
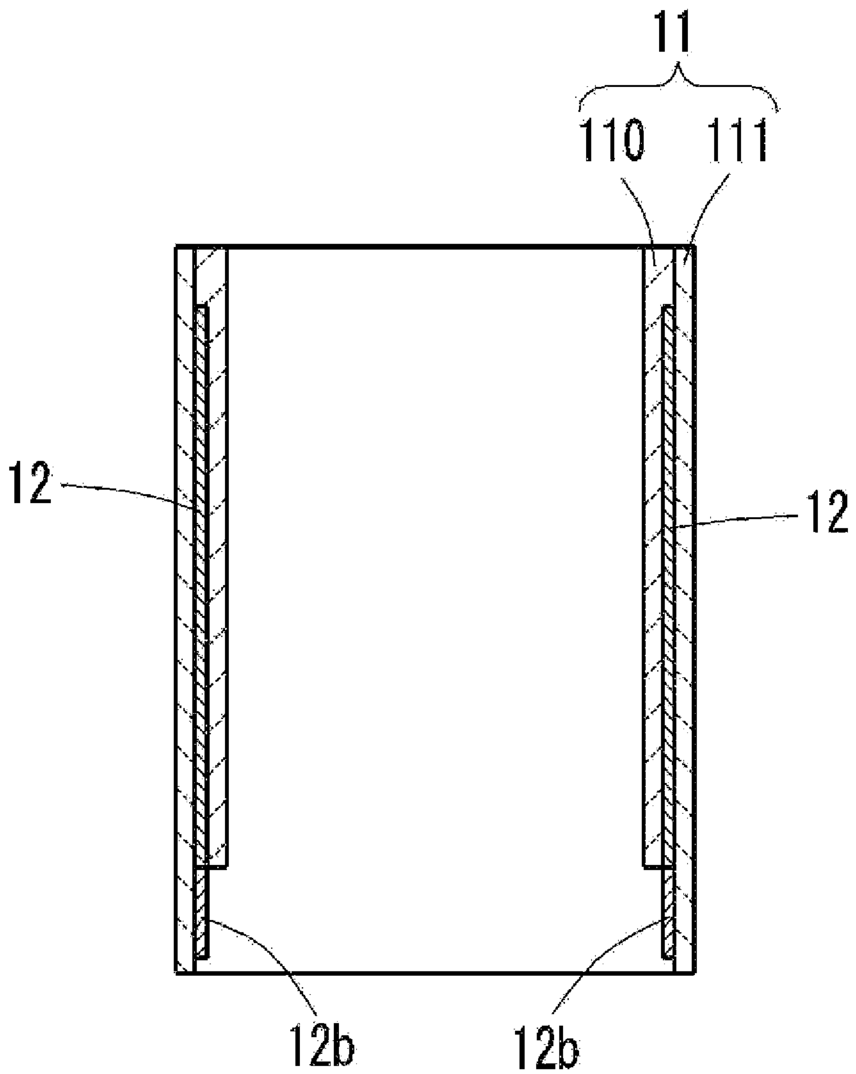
FIG. 8 is a longitudinal sectional view of the ceramic body.

FIG. 8 is a longitudinal sectional view of the ceramic body. For the ceramic body 11 illustrated in FIG. 8, for example, the outer portion 111 is longer than the inner portion 110 and protrudes at the second end 11*b* of the ceramic body 11. The protruding outer portion 111 causes the inner circumferential surface of the outer portion 111 to be exposed, and at least a portion of the connecting portion 12*b* in the heat element 12 to be on this inner circumferential surface. The connecting portion 12*b* includes a portion uncovered with the inner portion 110. The connecting portion 12*b* can thus be electrically connected to the external wire. A metal plating layer made of, for example, gold or nickel may be formed in the exposed area of the connecting portion 12*b*.

Figure 9:
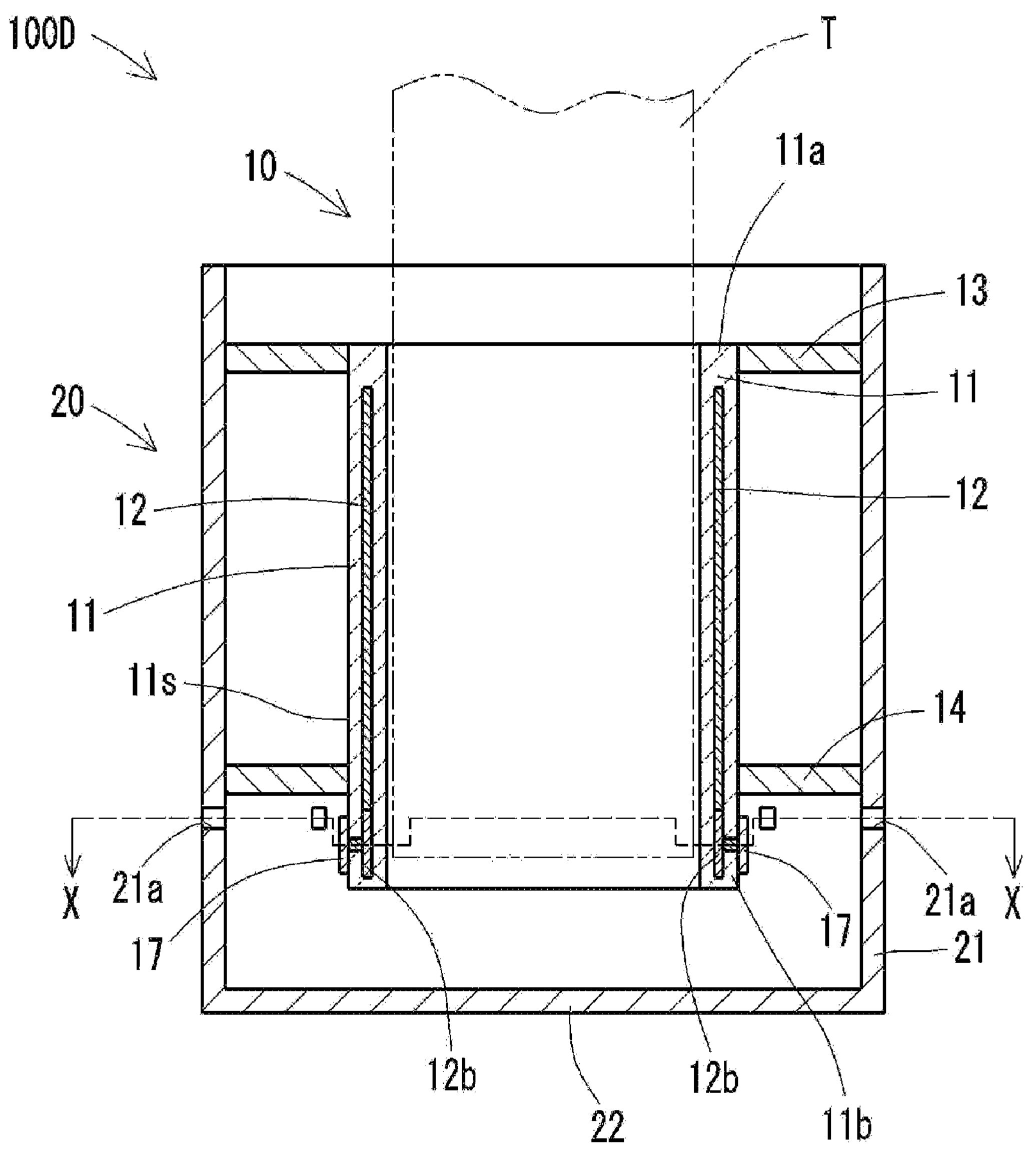
FIG. 9 is a longitudinal sectional view of a heater according to a fifth embodiment.
Figure 10:
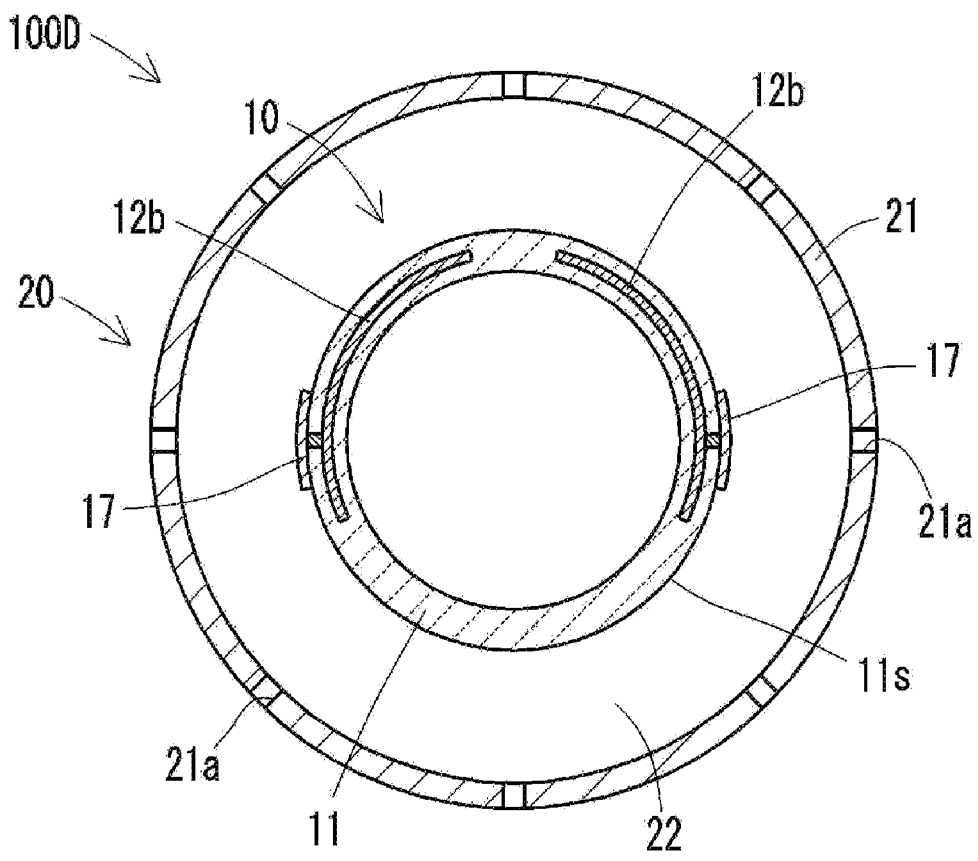
FIG. 10 is a cross-sectional view of the heater according to the fifth embodiment.

FIG. 9 is a longitudinal sectional view of a heater according to a fifth embodiment. FIG. 10 is a cross-sectional view of the heater according to the fifth embodiment. In the present embodiment, a heater 100D includes a connection terminal 17 located on the outer circumferential surface 11*s* of the ceramic body 11 to electrically connect the connecting portion 12*b* in the heat element 12 to the external wire. The connection terminal 17 may be electrically connected to the connecting portion 12*b* in an internal layer of the ceramic body 11. For example, an electrical conductor extends from the outer circumferential surface 11*s* of the ceramic body 11 through the connecting portion 12*b*. The connection terminal 17 is located on the outer circumferential surface 11*s* of the ceramic body 11 to cover the electrical conductor. Thus, the connection terminal 17 is electrically connected to the connecting portion 12*b*. The external wire is electrically connected to the connection terminal 17, and is electrically connected to the connecting portion 12*b*. The connection terminal 17 may be a metallized layer that is the same as or similar to the bonding layer 16, and may contain a metal material such as Mo, W, Mn, Ag, Cu, or Ti. A metal plating layer made of, for example, gold or nickel may be formed on the connection terminal 17. The connecting portion 12*b* in the heat element 12 is located at the second end 11*b* of the ceramic body 11. The connection terminal 17 is also located on the outer circumferential surface 11*s* at the second end 11*b* of the ceramic body 11. The second flange 14 is located nearer the middle of the ceramic body 11 than, for example, the connection terminal 17.

In the present embodiment, the heater 100D includes the peripheral wall 20 with a through-hole 21*a*. For example, the through-hole 21*a* is in the cylinder 21 in the peripheral wall 20. The through-hole 21*a* connects an external space to an internal space of the peripheral wall 20. For a gas flowing through the through-hole 21*a* from the internal space to the external space of the peripheral wall 20, the through-hole 21*a* functions as an outlet. For a gas flowing through the through-hole 21*a* from the external space into the internal space of the peripheral wall 20, the through-hole 21*a* functions as an inlet.

For the heater 100D as a heating device for a cigarette, for example, the through-hole 21*a* is located near the bottom 22 of the cylinder 21. When a user inhales for smoking, the pressure in the internal space of the heater 100D decreases to draw outside air through the through-hole 21*a* near the bottom 22 into the internal space. The outside air flowing through the through-hole 21*a* can cool the periphery of the connection terminal 17. Heat transfer from the higher-temperature region 12*a* may increase the temperature of the connecting portion 12*b* in the heat element 12 and may further increase the temperature of the connection terminal 17 connected to the connecting portion 12*b*. The external wire is bonded to the connection terminal 17 with, for example, solder. The bonding portion may generate heat. Such an increased temperature may cause connection failure between the connecting portion 12*b* and the external wire including, for example, partial separation of the connection terminal 17 from the ceramic body 11 and partial detachment of the external wire from the connection terminal 17. The outside air flowing through the through-hole 21*a* into the internal space as described above can cool the periphery of the connection terminal 17 to reduce the connection failure. For example, the through-hole 21*a* may be located in the circumferential direction of the cylinder 21 at equal intervals or may be unevenly located near the connection terminal 17.

In variations of the embodiments, for example, a through-hole may be located in the thickness direction of the first flange 13 and the second flange 14. The through-hole can increase resistance to heat transfer in the heat transfer path from the ceramic body 11 to the peripheral wall 20 and reduce heat loss.

A heating device including the heater according to each of the embodiments may include a housing accommodating the heater. The housing may be the peripheral wall 20. For the heater 100D according to the fifth embodiment to be accommodated in the housing, the housing may include a through-hole. Outside air flows into the housing to further flow inside the peripheral wall 20.

Although embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

The present disclosure may be implemented in the following forms.

In one aspect of the present disclosure, a heater includes a heater member including a ceramic body being cylindrical, a heat element in the ceramic body, and a plurality of flanges fixed on an outer circumferential surface of the ceramic body and extending away from the outer circumferential surface, and a peripheral wall surrounding the heater member in an axial direction and a circumferential direction. One flange of the plurality of flanges is located in one direction from a middle of the ceramic body in the axial direction, and another flange of the plurality of flanges is located in another direction from the middle of the ceramic body in the axial direction.

In the above aspect of the present disclosure, the heater transmits heat generated by the heater member through the flanges located nearer the ends than the middle in the axial direction. This reduces heat loss from the heater member and improves the heating performance.

Although embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

REFERENCE SIGNS

10 heater member
11 ceramic body
11*a* first end
11*b* second end
11*s* outer circumferential surface
12 heat element
13 first flange
14 second flange
15 glass material
16 bonding layer
17 connection terminal

20 peripheral wall
21 cylindrical member
21*a* through-hole
22 bottom
100, 100A, 100B, 100C, 100D heater
110 inner portion
111 outer portion
T heating target

The invention claimed is:

1. A heater, comprising:
a heater member comprising:
a ceramic body having a cylindrical shape, elongated in an axial direction and comprising an outer surface which has first and second halves in the axial direction;
a heat element inside the ceramic body; and
two or more flanges, each located on the outer surface of the ceramic body, and each elongated in a direction away from the outer surface, and comprising:
a first flange on the first half of the outer surface in the axial direction, and
a second flange on the second half of the outer surface in the axial direction; and
a peripheral wall surrounding the heater member in the axial direction and in a circumferential direction, wherein
the ceramic body comprises
a first end in the first half, and
a second end in the second half, the second end opposite to the first end, the first flange is located at the first end,
the second flange is located at the second end,
the peripheral wall includes an open end corresponding to the first end of the ceramic body, and
the heat element extends from the first end toward the second end and reaches a position of the second flange.

2. A heater, comprising:
a heater member comprising:
a ceramic body having a cylindrical shape, elongated in an axial direction and comprising an outer surface which has first and second halves in the axial direction;
a heat element inside the ceramic body; and
two or more flanges, each located on the outer surface of the ceramic body, and each elongated in a direction away from the outer surface, and comprising:
a first flange on the first half of the outer surface in the axial direction, and
a second flange on the second half of the outer surface in the axial direction; and
a peripheral wall surrounding the heater member in the axial direction and in a circumferential direction, wherein
the peripheral wall has a cylindrical shape with
one end in the axial direction being open and
another end in the axial direction, having a bottom closing the other end,
the ceramic body in the heater includes the first end in the first half located adjacent to the one end of the peripheral wall being open and the second end in the second half facing the bottom of the peripheral wall,
the first flange contains a resin material, and
the second flange contains a ceramic material.

3. A heater, comprising:
a heater member comprising:
a ceramic body having a cylindrical shape, elongated in an axial direction and comprising an outer surface which has first and second halves in the axial direction;
a heat element inside the ceramic body; and
two or more flanges, each located on the outer surface of the ceramic body, and each elongated in a direction away from the outer surface, and comprising:
a first flange on the first half of the outer surface in the axial direction, and
a second flange on the second half of the outer surface in the axial direction; and
a peripheral wall surrounding the heater member in the axial direction and in a circumferential direction, wherein
the second flange is fixed on the outer surface of the ceramic body with a glass material, and
an amount of a portion of the glass material located from the second flange toward the middle of the ceramic body in the axial direction is smaller than an amount of a portion of the glass material located from the second flange toward an end of the ceramic body in the other direction in the axial direction.

4. The heater according to claim 1, further comprising:
a connection terminal located on the outer surface of the ceramic body,
the connection terminal connecting a connecting portion of the heat element,
the connection terminal and the connecting portion being positioned closer to the second end than the second flange.

* * * * *